United States Patent Office 3,394,183
Patented July 23, 1968

3,394,183
PREPARATION OF 1,3-DIAMINO-2,4,6-TRINITROBENZENE
Joseph C. Dacons, Washington, D.C., and Mortimer J. Kamlet, Silver Spring, and John C. Hoffsommer, Hyattsville, Md., assignors to the United States of America as represented by the Secretary of the Navy
No Drawing. Filed Feb. 28, 1964, Ser. No. 348,908
20 Claims. (Cl. 260—581)

The invention described herein may be manufactured and used by or for the Government of the United States of America for governmental purposes without the payment of any royalties thereon or therefor.

This invention relates to a method for preparing a heat-resistant, insensitive explosive. More particularly, the invention is directed to a method suitable for the large scale production of 1,3-diamino-2,4,6-trinitrobenzene (DATB).

In the past, DATB has been prepared by the nitration of m-nitroaniline to 2,3,4,6-tetranitroaniline, followed by amination of the latter compound to produce DATB. The method, however, was time-consuming and increased demands for DATB have made it increasingly difficult for existing facilities to keep pace. Moreover, nitramine, an intermediate formed in the reaction, remained in the reaction mixture for prolonged periods and, upon heating the mixture to 70°–100° C., the nitramine decomposed emitting flashes of fire. Since the mixture itself was of an explosive nature, the danger of initiation by decomposition of the nitramine was ever present.

Accordingly, it has now been found that DATB may be easily and economically produced in large quantities by a process which proceeds via the sulfonation of 1,3-dimethoxybenzene (DMB), nitration of the sulfonic acids so-produced to give 1,3-dimethoxy-2,4,6-trinitrobenzene (DMTNB) and amination of the latter compound to DATB.

The invention is more particularly set forth in the following examples which are intended merely as specific embodiments of the invention and are not to be construed as a limitation of the scope thereof.

SULFONATION—NITRATION PROCEDURES

Example I

A 12 liter, 3-neck, round bottom flask was fitted with a dropping funnel, thermometer and mechanical stirrer. The flask was charged with 4200 ml. of 95% sulfuric acid. With stirring, there was rapidly added 735 g. of 1,3-dimethoxybenzene and the temperature was raised to 90°–100° C. on a steam bath. The solution turned green and on continued heating, a gray precipitate formed. After 30 minutes at 90°–100° C., the steam bath was replaced by an ice-salt bath and the temperature was lowered to 5°–10° C. A volume of 2800 ml. of 70% nitric acid was then added to the dropping funnel during the course of 2.5 hours, the rate being slow enough to keep the temperature from rising above 30° C. The reaction was extremely exothermic and the solution turned red-brown as the reaction progressed, with a tan precipitate forming and tending to float on top of the reaction mixture and to coat the walls of the flask. After about 1400 ml. of nitric acid had been added, there were no further exotherm and the remainder of the acid was added rapidly. The mixture was stirred for about 15 minutes after the addition of the nitric acid was complete and then poured into a sufficient quantity of crushed ice so that considerable ice remained unmelted after all of the reaction mixture had been added. As soon as the ice was completely melted, the mixture was filtered through a sintered glass funnel and the filter cake washed thoroughly with cold water. The crystalline, crude, 1,3-dimethoxy-2,4,6-trinitrobenzene, in the form of fine yellow needles, was attained in 87% yield. The product was sufficiently pure to be used directly in the amination step.

It has been found, as demonstrated in Table I, below, that the optimum ratio of reactants in this procedure is 1 volume of DMB to 6 volumes of $H_2SO_4$ and 4 volumes of $HNO_3$. Ratios above and below this range may be used but may cause difficulties with regard to foaming and the amount of recoverable product.

Runs 1–9 shown in Table I, below, set forth various modifications of the nitration procedure illustrated in Example I.

TABLE I.—NITRATION OF 1,3-DIMETHOXYBENZENE (DMB)

| | Sulfonation | | | | Nitration | | | | Products | |
|---|---|---|---|---|---|---|---|---|---|---|
| | Wt. DMB, g. | Vol., $H_2SO_4$, ml. | Temp., °C. | Time (Min.) | Vol., $HNO_3$, ml. | Conc., $HNO_3$, percent | Temp., °C. | Time (Min.) | Yield, g. | Percent Yield |
| Run: | | | | | | | | | | |
| 1 | 2.1 | 17 | 95–100 | 105 | 5 | 96 | 5–30 | 105 | 3.5 | 84 |
| 2 | 2.1 | 12 | 90–100 | 30 | 8 | 70 | 10–100 | 30 | 2.9 | 69 |
| 3 | 10.5 | 60 | 90–95 | 60 | 40 | 96 | 5–30 | 80 | 16.7 | 87 |
| 4 | 10.5 | 60 | 95–100 | 30 | 40 | 96 | 5–35 | 30 | 17.1 | 82 |
| 5 | 10.5 | 75 | 95–100 | 30 | 40 | 96 | 5–35 | 50 | 17.9 | 86 |
| 6 | 10.5 | 70 | 98–100 | 30 | 40 | 70 | 10–30 | 45 | 17.2 | 83 |
| 7 | 10.5 | 120 | 90–100 | 30 | 14 | 70 | 10–30 | 45 | | |
| 8 | 735 | 4,200 | 90–100 | 60 | 1,500 | 70 | 5–27 | 125 | 1,118 | 77 |
| 9 | 525 | 6,000 | 85–90 | 30 | 1,500 | 70 | 10–45 | ca. 150 | 888 | 85 |

Example II

In this example the foam encountered in Example I and in Runs 1–9 of Table I was eliminated by the use of 100% sulfuric acid (prepared by mixing 96% sulfuric acid with 30% oleum) in the sulfonation step, followed by the addition of nitric acid-30% oleum mixtures so that the system remained anhydrous at all times. By this modification, the foam was eliminated and the yields were raised to between 91–94%. The product in each case was crystalline and suitable for conversion to DATB without further purification. Runs 1–8 shown in Table 2, below, illustrate various reactant concentrations for the mixed acid treatment.

TABLE 2.—PREPARATION OF 1.3-DIMETHOXY-2,4,6-TRINITROBENZENE (DMTB) FROM m-DIMETHOXYBENZENE (DMB) BY MIXED ACID NITRATION

| Run | DMB, g. | Sulfonation a | | Nitration b | | DMTB Yield, percent |
|---|---|---|---|---|---|---|
| | | 30% Oleum, ml. | 96% H₂SO₄, ml. | 30% Oleum, g. | Nitric Acid, g. (Percent HNO₃) | |
| 1 | 2.1 | 9 | 15 | 11 | 7.5 (95.2%) | 94 |
| 2 | 2.1 | 4.5 | 7.5 | 11 | 7.5 (95.2%) | 94 |
| 3 | 10.5 | 45 | 75 | 55 | 37.5 (95.2%) | 92 |
| 4 | 10.5 | 22.5 | 37.5 | 55 | 37.5 (95.2%) | 91 |
| 5 | 10.5 | 12.4 | 20.6 | 55 | 37.5 (95.2%) | 90 |
| 6 | 10.5 | 66 | 53 | 55 | 37.5 (95.2%) | (c) |
| 7 | 210 | 450 | 750 | 256 | 750 (97.7%) | 87 |
| 8 | 105 | 450 | 750 | 128 | 375 (97.7%) | 89 | a Standard conditions for sulfonation, 30 min. at 90–95°.
b Nitric acid-oleum mixture added dropwise over 15–30 min. period keeping temperature below 30°. Mixture then heated to 60–65° for 30 min.
c No Product.

A detailed embodiment of this alternative procedure is as follows:

A 3-necked, round bottomed, 5 liter flask was fitted with a thermometer, dropping funnel and mechanical stirrer and charged with a mixture of 450 ml. 30% oleum and 750 ml. 96% sulfuric acid. To the stirred solution there was added 210 g. (194.4 ml.) of m-dimethoxybenzene over a 5-minute interval. The greenish mixture was heated to 90–95° C. for 15 minutes and then cooled to 5° C. A cold solution of 100% nitric-100% sulfuric acids, prepared by adding 750 g. of nitric acid (assay 97.7%) to 256 g. 30% oleum was then added drop-wise to the stirred, cold mixture at such a rate as to keep the temperature below 30° C. A reddish precipitate which turned light tan started to thicken at the surface when about one-third to one-half of the nitric acid solution had been added but as further nitric acid solution was added the reaction mixture thined out. The addition required 15 to 30 minutes. The contents of the flask were then heated to 40–45° C., maintained at this temperature for 15 minutes and then cooled in an ice-bath. The reaction mixture was then washed, filtered and dried in air, a yield of 357 g. (86% of theoretical) of 1,3-dimethoxy-2,4,6-trinitrobenzene being obtained. The product was suitable for conversion to DATB without further purification.

The ratio of oleum plus $H_2SO_4$ to $HNO_3$ is critical since either an excess or deficiency of oleum will cause foaming as the temperature is raised (note Run #6, Table 2). Optimum ratios are calculated to insure that the reaction mixture remains anhydrous. In the sulfonation step, for example, the ratio of oleum to $H_2SO_4$ is about 1 to 1.6 by volume. In the nitration step the ratio of oleum to $HNO_3$ is about 1 to 1.4 by weight.

Example III

This example shows a modification of the mixed acid addition treatment of Example II and proceeds via use of a mixture of sulfuric acid and potassium nitrate in lieu of sulfuric acid-nitric acid. A 500 ml., three-necked, round bottom flask was equipped with thermometer, dropping funnel and mechanical stirrer. The flask was charged with 100 ml. of 100% sulfuric acid. While stirring vigorously, 10.5 g. (0.076 moles) of 1,3-dimethoxybenzene was added slowly. During the addition, the solution turned dark green and the temperature rose to 45° C. The mixture was then heated in a steam bath to 95–100° C. and then cooled to 10° C. in an ice bath. At this time the mixture had turned dark brown and a small amount of precipitate had formed. An amount of 35 g. (0.35 mole) of potassium nitrate was added portion-wise, keeping the temperature at 25° C. or lower. After about two-thirds of the dry salt had been added the exotherm ceased and the mixture had the consistency of a paste. When all of the potassium nitrate had been added the mixture was heated slowly to 50° C. and held at that temperature for about 15 minutes, during which time the mixture became thick but no foaming was apparent. The mixture was then cooled to room temperature and drowned in approximately 1 liter of crushed ice in water. The product was recovered by filtration and washed with cold water. After drying in air the yield was 19.7 g. (95%) of crystalline 1,3-dimethoxy-2,4,6-trinitrobenzene.

AMINATION PROCEDURES

Example IV

To illustrate amination with ammonia, a 200 ml. 3-neck, round bottom flask was fitted with a mechanical stirrer, a thermometer and a dropping funnel. A volume of 25 ml. of absolute methanol was added to the flask, cooled to 7° C. and saturated with anhydrous ammonia. Ten grams of 1,3-dimethoxy-2,4,6-trinitrobenzene was then dissolved in 50 ml. of warm benzene and the solution was filtered. The filtrate was then cooled to room temperature and added dropwise with cooling and stirring to the methanolic ammonia. The addition required ten minutes and the reaction temperature was not allowed to rise above 13° C. During the addition, the solution becomes red-orange in color and a yellow crystalline solid began to form. Stirring and cooling were continued for an additional twenty minutes, after which the yellow solid was collected by filtration and washed with ethanol. After drying there was obtained 8.44 g. (96% theoretical) of DATB having a particle size of approximately three microns.

Example V

To illustrate amination with ammonium acetate, five grams of DMTNB in 50 ml. of absolute ethanol and 30 ml. of benzene was added in one portion at 70° C. to a solution of ten grams of ammonium acetate in 50 ml. of absolute ethanol and 10 ml. of benzene. A yellow precipitate began to form immediately and the reaction mixture was heated for fifteen minutes on a steam bath, cooled to 50° C., filtered and washed with ethanol and ether. DATB was obtained in a yield of 3.79 g. (86% of theoretical) having a particle size of 50–60 microns.

Example VI

To illustrate amination with ammonium acetate and acetic acid, a solution of 50 grams of ammonium acetate in 5 ml. of glacial acetic acid 100 ml. of absolute ethanol was brought to a boil on the steam bath. Five grams of DMTNB was dissolved in 50 ml. of boiling benzene, the solution was filtered hot and added to the boiling ammonium acetate-acetic acid solution. As in the previous example, a yellow precipitate began to form immediately and the mixture was allowed to stand on the steam bath at a temperature just below boiling for one hour, cooled to room temperature and allowed to stand overnight. Upon filtration and washing first with absolute ethanol then with ether, there was obtained a yield of DATB of 3.99 g. (91% of theoretical) having a particle size of 75–100 microns.

As is seen from the immediately preceding examples, the particle size of the DATB product may be varied by regulating the reaction rate and the solubility of the product in the reaction solvent. By retarding or accelerating the reaction rate alone or in combination with the use of ammonium acetate and ammonium acetate-acetic acid in ethanol, a particle size range of from about 3 to about 100 microns or more may be obtained. For example, if DMB is reacted overnight with ammonium acetate-acetic acid, a product having a particle size of about 500 microns will be obtained.

The temperature at which the reaction is run during the various steps is more or less discretionary but, in general, the sulfonation temperature is about 90–100° C., the nitration temperature is from about room temperature or lower up to about 90° C. and the amination temperature is from about room temperature or below, up to the reflux temperature of the particular solvent being used.

The solvents used in the sulfonation and nitration steps are the acids being used. In the amination step any solvent, in which DMTNB and ammonia are soluble, may be used. Lower aliphatic alcohols, such as methanol and ethanol, and aromatic hydrocarbons, such as benzene, are preferred.

In the amination step, ammonia and ammonium acetate are preferred but other ammonium salts may be used and, in fact, any material or compound which will generate ammonia in situ may be used.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The method of preparing 1,3-diamino-2,4,6-trinitrobenzene which comprises sulfonating 1,3-dimethoxybenzene to produce sulfonic acids thereof, nitrating said sulfonic acids to produce 1,3-dimethoxy-2,4,6-trinitrobenzene and aminating said 1,3-dimethoxy-2,4,6-trinitrobenzene to produce 1,3-diamino-2,4,6-trinitrobenzene.

2. The process of claim 1 in which the sulfonation step is carried out by reacting 1,3-dimethoxybenzene with sulfuric acid.

3. The process of claim 2 in which the ratio of acid to 1,3-dimethoxybenzene is about 6:1 by volume.

4. The process of claim 1 in which the sulfonation step is carried out by reacting 1,3-dimethoxybenzene with a mixture of concentrated sulfuric acid and oleum.

5. The process of claim 4 wherein the ratio of oleum to sulfuric acid is about 1 to 1.6 by volume.

6. The process of claim 1 wherein the nitration step is carried out by reacting the sulfonic acids with nitric acid.

7. The process of claim 6 wherein the ratio of nitric acid in the nitration step to the sulfuric acid used in the sulfonation step is about 4:6 by volume.

8. The process of claim 1 wherein the nitration step is carried out by reacting the sulfonic acids with a mixture of nitric acid and oleum.

9. The process of claim 8 wherein the ratio of nitric acid to oleum is about 1.4 to 1 by weight.

10. The process of claim 1 wherein the nitration step is carried out by reacting the sulfonic acids with potassium nitrate.

11. The process of claim 1 wherein the amination step is carried out by reacting 1,3-dimethoxy-2,4,6-trinitrobenzene with ammonia.

12. The process of claim 1 wherein the amination step is carried out by reacting 1,3-dimethoxy-2,4,6-trinitrobenzene with a compound which will generate ammonia in situ.

13. The process of claim 12 wherein said compound is an ammonium salt.

14. The process of claim 13 wherein said ammonium salt is ammonium acetate.

15. The process of claim 12 wherein the amination step is carried out by reacting 1,3-dimethoxy-2,4,6-trinitrobenzene with a solution of ammonium acetate in acetic acid.

16. The process of claim 1 wherein the solvent used in the amination step may be any solvent in which 1,3-dimethoxy-2,4,6-trinitrobenzene and ammonia are soluble.

17. The process of claim 16 wherein said solvent is selected from the group consisting of lower aliphatic alcohols and aromatic hydrocarbons.

18. The process of claim 1 wherein the temperature of the sulfonation step is about 90°–100° C.

19. The process of claim 1 wherein the temperature of the nitration step is from about room temperature to about 90° C.

20. The process of claim 1 wherein the temperature of the amination step is from about room temperature to the reflux temperature of the solvent being used.

References Cited

UNITED STATES PATENTS 3,278,604   10/1966   Hoffman et al. _____ 260—581

CHARLES B. PARKER, *Primary Examiner.*

P. C. IVES, *Assistant Examiner.*